United States Patent [19]

Heerah

[11] Patent Number: 4,682,227

[45] Date of Patent: * Jul. 21, 1987

[54] DIGITAL VIDEO SIGNAL PROCESSING APPARATUS FOR PROVIDING ZOOM AND COMPRESSIVE IMAGES WITH SOFT FOCUS

[75] Inventor: Atma Heerah, Cambridge, England

[73] Assignee: U.S. Philips Corporation, New York, N.Y.

[*] Notice: The portion of the term of this patent subsequent to Apr. 21, 2004 has been disclaimed.

[21] Appl. No.: 721,252

[22] Filed: Apr. 8, 1985

[30] Foreign Application Priority Data

Apr. 26, 1984 [GB] United Kingdom ............... 8410707

[51] Int. Cl.[4] .......................................... H04N 5/262
[52] U.S. Cl. ..................................... 358/160; 358/22
[58] Field of Search ................. 358/22, 160, 182, 183

[56] References Cited

U.S. PATENT DOCUMENTS 4,163,249 7/1979 Michael et al. ................ 358/21 R
4,282,546 8/1981 Reitmeier ........................ 358/22
4,422,095 12/1983 Hosoya .......................... 358/166
4,538,178 8/1985 Bolger ........................... 358/166

Primary Examiner—John W. Shepperd
Attorney, Agent, or Firm—Thomas A. Briody; William J. Streeter; Gregory P. Gadson

[57] ABSTRACT

A video signal processing apparatus comprises an input (1) for receiving an input video signal and an output (2) at which the processed signal is produced. The apparatus includes a vertical filter (3), a horizontal filter (4), a vertical interpolator (5) a horizontal interpolator (6), and a field store (7) arranged in cascade. The cut-off frequencies of the vertical and horizontal filters (3,4) are adjustable by means of signals passed over paths (18 and 19) from the control circuit (8) to the filters (3,4). A control apparatus comprising a potentiometer (25), a switch (23), and an analogue to digital converter (26) produces signals which are passed over a path (24) to the control circuit (8). These signals are used to cause the control circuit (8) to produce signals over paths (18,19) to the filters (3,4) which reduce the cut-off frequencies of the filters to a value which is below that appropriate to the picture size. This produces a soft focus effect.

7 Claims, 7 Drawing Figures

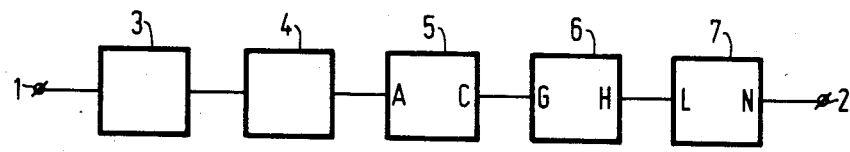
FIG. 2 NORMAL PICTURE
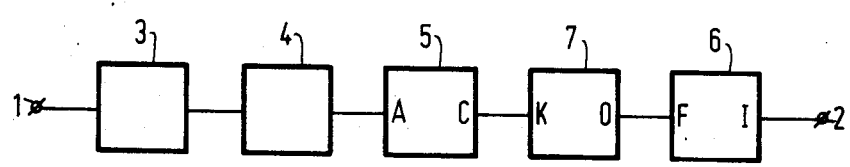
FIG. 3 VERTICAL SQUEEZE
HORIZONTAL ZOOM
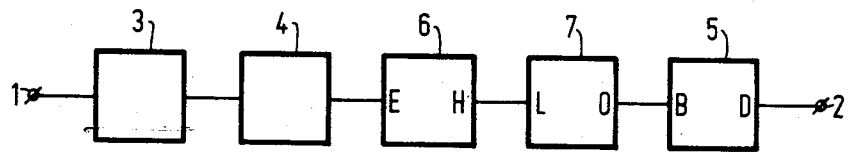
FIG. 4 HORIZONTAL SQUEEZE
VERTICAL ZOOM
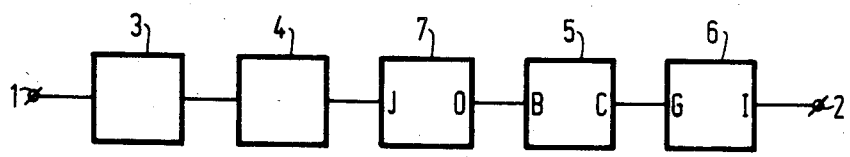
FIG. 5 HORIZONTAL AND
VERTICAL ZOOM

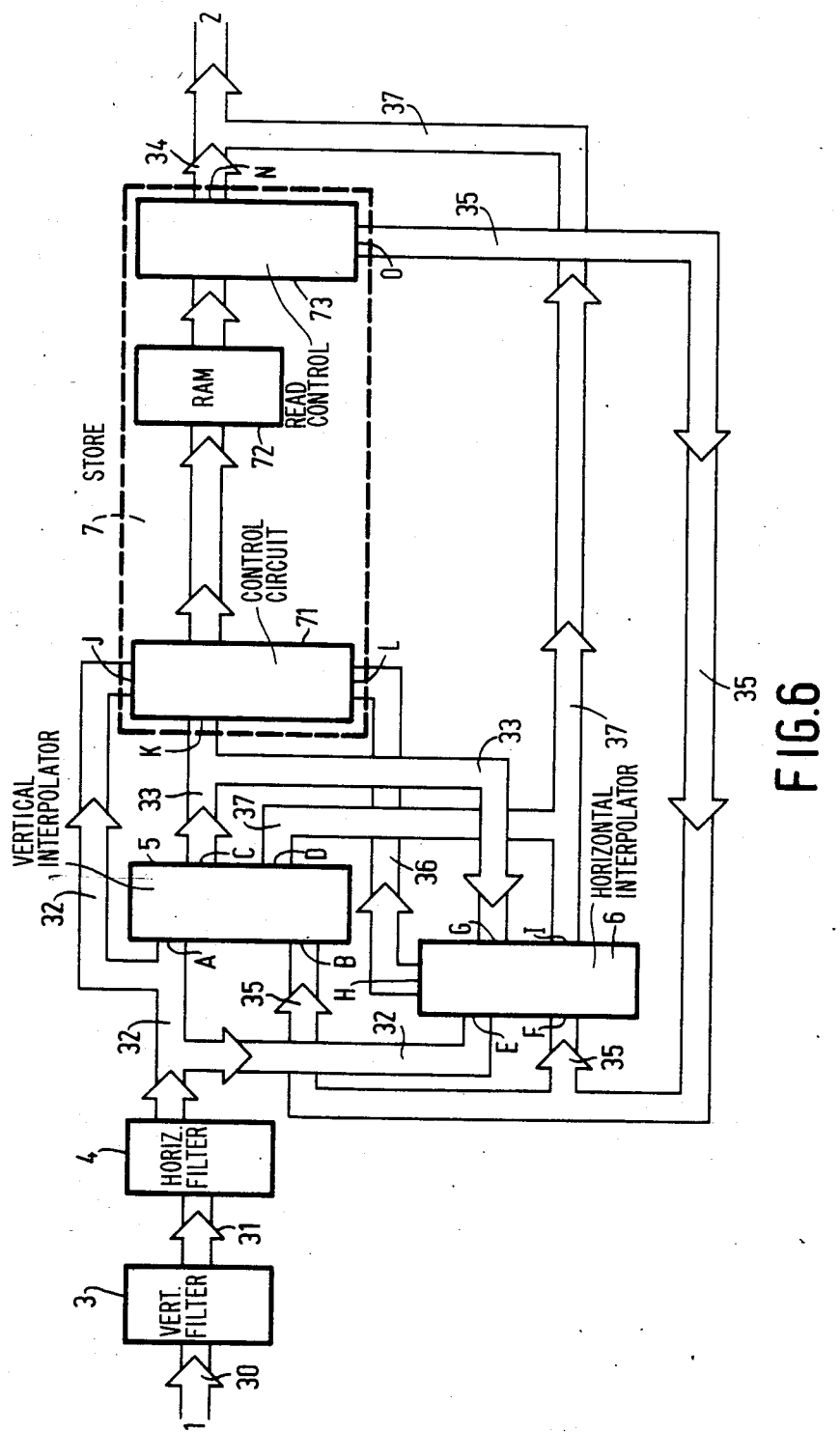

DIGITAL VIDEO SIGNAL PROCESSING APPARATUS FOR PROVIDING ZOOM AND COMPRESSIVE IMAGES WITH SOFT FOCUS

The invention relates to a video signal processing arrangement for television signals encoded in digital form comprising a horizontal interpolator, a vertical interpolator, a field store, a horizontal and/or a vertical low pass filter for filtering the input video signal before application to the horizontal and vertical interpolators and the field store, and means for reducing the cut off frequency of the horizontal and/or vertical filter as the picture size is reduced in the horizontal and/or vertical direction.

There is a requirement for television studio equipment which is capable of producing a variety of effects using one or more picture sources and processing the video signal inputs to produce these effects. These effects may require the mixing together of several separate sources, the repetitive display of the same picture at a plurality of locations on the display screen and the increase or decrease of the size of individual pictures. The video signals are commonly in digital form and a specification for digital video signals in television studio equipment has been issued by the European Broadcasting Union. Amongst other things this specification states that the luminance signal should be sampled at 13.5 MHz and be digitised to form an 8 bit PCM code. The colour difference signals R-Y and B-Y are sampled at 6.75 MHz and time division multiplexed to provide a second data stream at a rate of 13.5 MHz.

Effects generators for such digitally encoded video signals normally include a field or frame store, i.e. a read-write memory organised to store a complete television field or frame in digital form. When it is required to compress or expand the picture in the horizontal or vertical direction it is desirable to interpolate the sampled video input to fit the input video signal samples to the output video signal samples. Thus if a picture is to be compressed (or squeezed) in either direction the input signal sample rate will not match the output signal sample rate. In the simple case where the output picture is to be half the input picture size then only alternate picture samples are stored and the others could be simply discarded. However, for most other reductions in size such a simple arrangement is not possible and hence to obtain a more satisfactory picture an interpolator is used to calculate the sample values to be stored from the adjacent sample values. Separate interpolators are used for the horizontal and vertical directions. If the picture is to be expanded (or zoomed) in either direction it is necessary to generate additional sample values from the input sample values. In this case the input samples are stored in the field store and the interpolator(s) take the stored samples and calculate the required intermediate values. Thus the system comprises four interpolators two at the input to the store and two at the output of the store plus appropriate control circuitry to control the operation of the interpolators. This leads to an expensive and complex system. A further effect which is sometimes desired is a soft focus effect. This is normally achieved by defocusing the camera lens or by placing an optical device in front of the lens.

SUMMARY OF THE INVENTION

It is an object of the invention to enable the provision of an alternative means for producing a soft focus effect.

The invention provides a video signal processing arrangement characterised in that further means are provided for reducing the cut-off frequency of the horizontal and or vertical filter to a frequency which is less than the bandwidth of the input video signal in a manner which is independent of the picture size, said further means being actuated when the production of a soft focus effect is desired.

This enables an electronic soft focus effect to be produced at low cost since the horizontal and vertical filters are already required to prevent aliasing effects when the picture is compressed. Thus it is possible to use already existing filters with the addition of a small amount of additional circuitry, basically only a switch is required, to produce an additional effect, that is a soft focus effect.

In this specification the horizontal direction is defined as being in the direction of the line scan, the vertical direction is defined as being in the direction of the field scan, and a field store is defined as a store capable of storing one or more fields of a television picture and, in particular, includes a frame store.

The means for reducing the cut-off frequency of the filters may comprise a read only memory containing a plurality of sets of filter co-efficients at different memory locations therein and means for addressing the read only memory in dependence on the selected picture size so that the appropriate filter co-efficients are fed to the filters.

This provides a simple and inexpensive means for controlling the cut-off frequency of the filter.

The further means which may be a selection switch may be arranged to address a single read only memory location for each filter.

Thus the selection switch can be arranged to address the read only memory location containing co-efficients which correspond to the lowest value for the cut-off frequency of the horizontal and vertical filters.

Alternatively the further means may be capable of providing a variable cut-off frequency for the horizontal and vertical filters, in which case the further means may comprise a variable voltage source, a selection switch and an analogue to digital converter, the output of the analogue to digital converter being coupled to address inputs of the read only memory.

DESCRIPTION OF THE FIGURES

An embodiment of the invention will now be described, by way of example, with reference to the accompanying drawings, in which:

FIGS. 2 to 5 illustrate the alternative store and interpolator positions for various signal processing states, FIG. 6 illustrates the interconnection of circuit units to enable the achievement of the configurations of FIGS. 2 to 5.

DESCRIPTION OF THE PREFERRED EMBODIMENT

Figure 1:
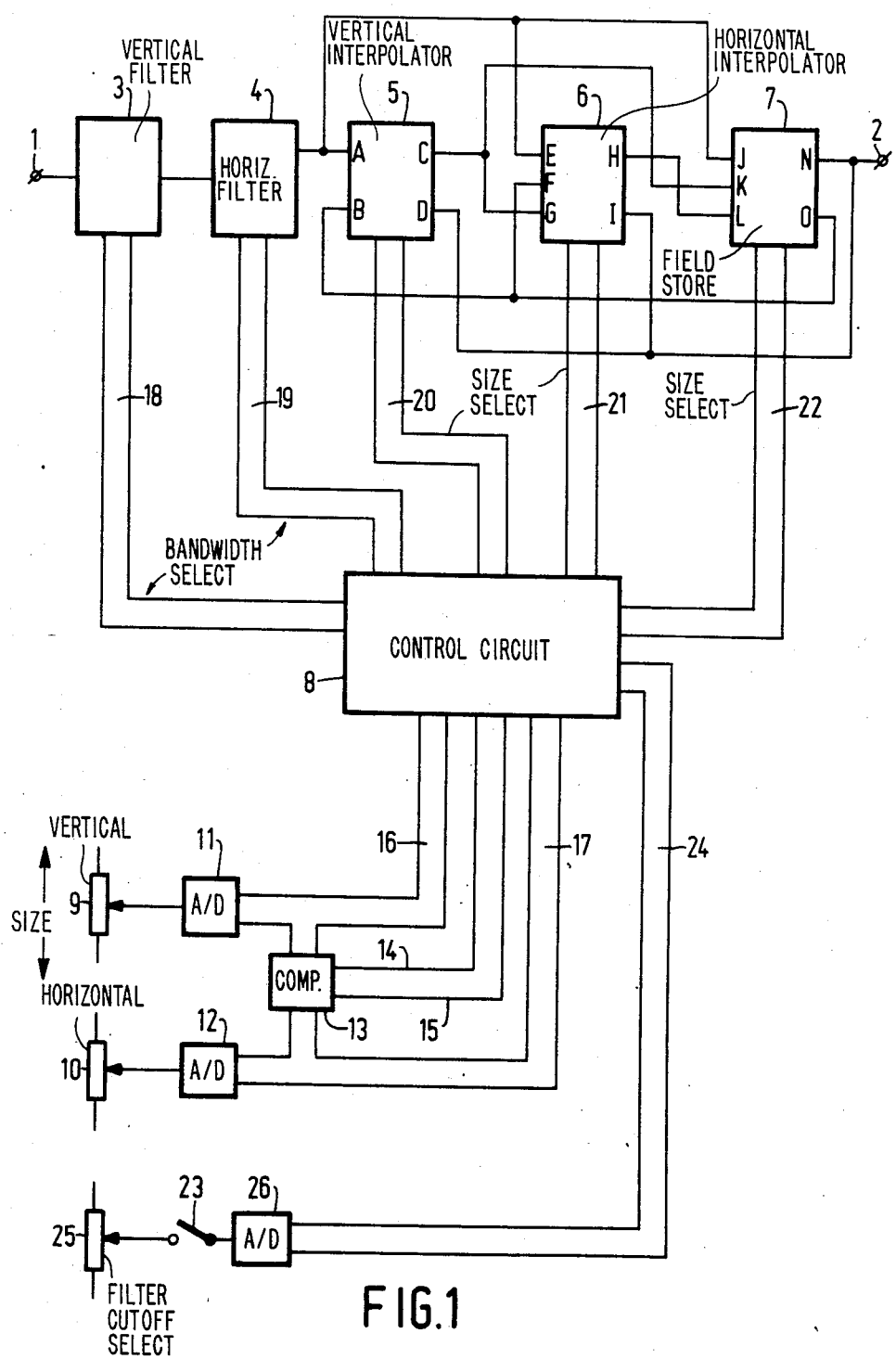
FIG. 1 shows in block schematic form a video signal processing arrangement according to the invention.

FIG. 1 shows a video signal processing circuit having a video signal input 1 and a processed video signal output 2. Between the input 1 and output 2 is arranged a vertical filter 3, a horizontal filter 4, a vertical interpolator 5, a horizontal interpolator 6, and a field store 7. It should be noted that throughout this specification the term horizontal refers to the line scan direction and vertical refers to the field scan direction.

The television picture required for display may be the same size as that represented by the input video signal, an expanded (or zoomed) version of the input video signal, or a compressed (or squeezed) version of the input signal. The expansion or compression may be in either the vertical or horizontal direction or both simultaneously. In particular the picture may be squeezed in one direction and zoomed in the other.

If a picture is squeezed or zoomed then it is desirable to use interpolators to derive intermediate samples from the normal sized picture samples. If the picture is to be squeezed it is necessary to perform the interpolation before entering the sample in the field store whereas if the picture is to be zoomed the interpolation should be carried out on the samples taken from the store. This has previously been achieved by providing separate interpolators connected both before and after the store.

The arrangement shown in FIG. 1 includes a control circuit 8 which produces a number of signals which control the bandwidths of the vertical and horizontal filters 3 and 4, control the interpolators 5 and 6 to cause them to perform the necessary calculations to determine the intermediate sample values, control the addressing of the store to determine the position within the store at which the samples are stored, and cause the arrangement of the interpolators 5 and 6 and store 7 to be reconfigured so that the interpolators can be selectively positioned either before or after the store.

Two control potentiometers 9 and 10 control the vertical and horizontal picture size, respectively. The voltages produced by these potentiometers are converted into a digital signal by means of two analogue to digital converters 11 and 12. The outputs of the analogue to digital converters (ADCs) 11 and 12 are connected to a comparator arrangement 13 which produces first and second outputs to indicate whether the signal is to be vertically or horizontally zoomed, these signals being conveyed to the control circuit 8 over lines 14 and 15. The output of the ADC's 11 and 12 are also fed to the control circuit 8 over data paths 16 and 17, respectively.

The control circuit 8 controls the bandwidth of the filters 3 and 4 by means of signals passed over data paths 18 and 19, respectively, and controls the interpolators 5 and 6 over data Paths 20 and 21, respectively. The interpolators 5 and 6 are Provided with control signals which indicate the picture size and hence enable the interpolator to determine the sample positions which have to be calculated and further signals to control their positions relative to the store 7. The control circuit 8 provides signals over a data path 22 to the store 7 to indicate the position within the store at which the picture is to be stored and the position in the circuit arrangement of the store 7 relative to the interpolators 5 and 6. A switch 23 is connected to the control circuit 8 via a path 24 to cause the control circuit to produce filter co-efficients for the horizontal and vertical filters 3 and 4 which cause their cut-off frequencies to assume a minimum value. This produces an effect on the displayed picture analogous to a soft-focus effect. A potentiometer 25 and an analogue to digital converter (ADC) 26 may be included to enable the cut-off frequency of either or both filters to be made adjustable. For a 625 line PAL encoded signal the useful range of cut-off frequencies extends from about 1 MHz to 4 MHz. Above 4 MHz the soft focus effect becomes less noticeable, while below 1 MHz the detail lost may become unacceptable. With different video signal bandwidths or when effects such as posterisation are produced other cut-off frequencies may be desirable.

FIGS. 2 to 5 illustrate how the interpolators 5, 6 and store 7 are reconfigured for various combinations of vertical and horizontal squeeze and zoom. FIG. 2 shows the configuration for a normal size picture or one which is squeezed in either or both directions without a zoom in either direction. In this case both the horizontal and vertical interpolators 6 and 5 operate on the video signal before it is stored and in addition the horizontal and vertical filters 4 and 3 are controlled to have a cut-off frequency which is dependent on the picture size i.e. as the picture size is reduced the cut-off frequency is reduced (the horizontal and vertical filters are low pass filters). FIG. 3 shows the configuration when the picture is squeezed in the vertical direction and zoomed in the horizontal direction. In this case the horizontal filter 4 is disabled to form an essentially straight through path, the vertical interpolator 5 is arranged before the store 7 and the horizontal interpolator 6 is arranged after the store 7. FIG. 4 shows the configuration when the picture is squeezed in the horizontal direction and zoomed in the vertical direction. In this case the vertical filter 3 is disabled to form an essentially straight through path, the horizontal interpolator 6 is arranged before the store 7 and the vertical interpolator 5 is arranged after the store 7. FIG. 5 shows the configuration when the picture is zoomed in both the horizontal and vertical directions. In this case both the vertical and horizontal filters 3 and 4 are disabled and both the vertical and horizontal interpolators 5 and 6 are arranged after the store 7. The positions of the vertical and horizontal filters 3 and 4 may be reversed so that the horizontal filter 4 comes before the vertical filter 3, the choice of which comes first being purely arbitrary. Similarly when both interpolators are on the same side of the store, i.e. as shown in FIG. 2 and FIG. 5, it is not important which comes first.

FIG. 6 illustrates how the vertical and horizontal filters 3 and 4, the vertical and horizontal interpolators 5 and 6, and the store 7 may be interconnected to allow them to be configurable as shown in FIGS. 2 to 5. The input 1 is connected to the input of the vertical filter 3 by a data path 30 while the output of the vertical filter 3 is conected to the input of the horizontal filter 4 via a data path 31. The output of the horizontal filter 4 is connected via a data path 32 to a first input A of the vertical interpolator 5, to a first input E of the horizontal interpolator 6, and to a first input J of the store 7. A first output C of the vertical interpolator 5 is connected via a data path 33 to a second input K of the store 7 and to a second input G of the horizontal interpolator 6. A first output N of the store 7 is connected via a data path 34 to the output 2 of the arrangement. A second output O of the store 7 is connected via a data path 35 to a second input B of the vertical interpolator 5 and to a third input F of the horizontal interpolator 6. A first output H of the horizontal interpolator 6 is connected to a third input L of the store 7 via a data path 36 while a second output I of the horizontal interpolator 6 is connected via a data path 37 to a second output D of the vertical interpolator 5 and to the output 2 of the arrangement. The store 7 comprises a write control circuit 71, a block of random access memory (RAM) 72, and a read control circuit 73. The inputs to the store 7 are by way of the write control circuit 71 while the oututs are available from the read control circuit 73. The inputs of the interpolators 5 and 6 and the store 7 are connected to the data paths by way of latches so that by enabling the appropriate latch at the appropriate time the information on a data path connected to that input may be either accepted into the corresponding interpolator or store or ignored. Similarly the outputs of the interpolators and store are coupled via latches or buffers which are selectively enabled. It should be noted that where two outputs are connected to a single data path the latches or buffers should have tri-state outputs.

When the arrangement is set for a normal sized or a squeezed picture without a zoom in either direction, i.e. as shown in FIG. 2 the latches at the first input A of the vertical interpolator 5 are enabled so that data from the output of the filter 4 can be entered into the vertical interpolator 5. However, the latches at the first inputs E and J of the horizontal interpolator 6 and store 7 are disabled so that no data from path 32 enters these circuits. The first output C of the vertical interpolator 5 is enabled and so is the second input G of the horizontal interpolator 6. Hence the data from the first output C of the vertical interpolator 5 is fed via path 33 to the second input G of the horizontal interpolator 6 and accepted by the horizontal interpolator 6. However the second input K of the store 7 is not enabled and hence the store 7 ignores information on the data path 33. The first output H of the horizontal interpolator 6 is enabled and so is the third input L of the store so that data from the horizontal interpolator 6 is fed via the data path 36 to the store 7. The first output N of the store is enabled and so the output of the store 7 is fed via path 34 to the output 2 of the arrangement. The second output D of the vertical interpolator 5 and the second output I of the horizontal interpolator 6 are not enabled so there is no conflicting data presented to the output 2. Thus by enabling the first input A and first output C of the vertical interpolator 5, the second input G and first output H of the horizontal interpolator 6, and the third input L and first output N of the store 7 while disabling all other inputs and outputs of the store and interpolators the arrangement is configured as shown in FIG. 2. Similarly to arrive at the configuration shown in FIG. 3 the first input A and first output C of the vertical interpolator 5 are enabled, the second input K and second output O of the store 7 are enabled, and the third input F and second output I of the horizontal interpolator 6 are enabled while all other inputs and outputs are disabled. The configurations shown in FIGS. 4 and 5 can be similarly derived. It should be noted that it is only necessary to disable those outputs which are connected to other outputs and thus some of the outputs may be permanently enabled provided the inputs to which they are connected can be selectively enabled and disabled. This can lead to a simplification of the control circuit.

Returning to the arrangement shown in FIG. 1 the filters 3 and 4 are low pass digital filters whose co-efficients are fed to them over the data paths 18 and 19 respectively from the control circuit 8. The filters 3 and 4 are arranged to track the picture size i.e. they have a maximum cut-off frequency when the picture size is normal and the cut-off frequency is reduced as the picture size is reduced. When the picture is zoomed the filters may be disabled to provide an essentially straight through path. The cut-off frequency of the filters is determined by the co-efficients fed to them over the paths 18 and 19 from the control circuit 8 which derives the required co-efficients from the picture size information fed to it via paths 16 and 17 possibly in conjunction with the signals on lines 14 and 15. To produce the filter co-efficients the control circuit 8 includes a read only memory having memory locations addressed by the outputs of the ADC's 11 and 12. The ADC's 11 and 12 produce digital codes which represent the picture size as set up by the potentiometers 9 and 10. At each memory location a set of filter co-efficients are stored which have been pre-calculated to produce the desired cut-off frequency for the size of picture represented by the memory location address. The disabling of the filters 3 and 4 may be controlled by the signals on lines 14 and 15 which indicate that a picture zoom has been selected. The comparator arrangement 13 takes the outputs of the ADC's 11 and 12 and compares them with a preset number to determine whether a picture zoom has been selected in either the vertical or horizontal direction. Thus if the comparator 13 detects that a picture zoom has been selected it causes a signal to be passed to the control circuit 8 over line 14 and/or 15. The control circuit 8 includes a read only memory which encodes the signals on lines 14 and 15 to produce appropriate enable signals for the inputs and outputs of the vertical and horizontal interpolators 5 and 6 and store 7 which are passed to these units over the data paths 20, 21 and 22 respectively the read only memory may be programmed as shown in Table 1, an enable signal corresponding to a stored '0' and a disable signal corresponding to a stored '1'.

TABLE 1

| INPUT ADDRESS | | STORE CONTENTS | | | | | | | | | | | | | FIGURE |
|---|---|---|---|---|---|---|---|---|---|---|---|---|---|---|---|
| 14 | 15 | A | B | C | D | E | F | G | H | I | J | K | L | N O | CHOICE |
| 0 | 0 | 0 | 1 | 0 | 1 | 1 | 1 | 0 | 0 | 1 | 1 | 1 | 0 | 0 0 | 2 |
| 0 | 1 | 1 | 0 | 0 | 0 | 0 | 1 | 1 | 0 | 1 | 1 | 1 | 0 | 1 0 | 4 |
| 1 | 0 | 0 | 1 | 0 | 1 | 1 | 0 | 1 | 0 | 0 | 1 | 0 | 1 | 1 0 | 3 |
| 1 | 1 | 1 | 0 | 0 | 1 | 1 | 1 | 0 | 0 | 0 | 0 | 1 | 1 | 1 0 | 5 |

The capacity of the read only memory may be reduced by inspection of the contents of table 1. For example where the state of an output does not change as the address changes the corresponding latch or buffer may be permanently connected to a fixed enabling potential. Further certain inputs/outputs have common states and these may be tied together.

Figure 7:
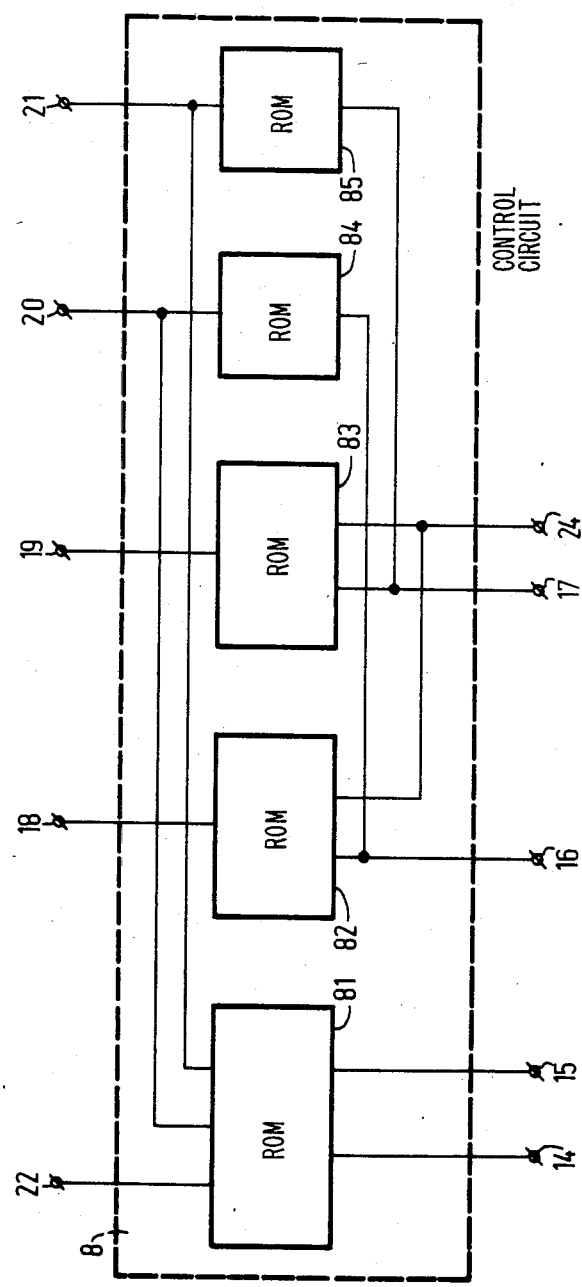
FIG. 7 shows a control circuit suitable for use in the arrangement of FIG. 1.

FIG. 7 shows the control circuit 8 in further detail the control circuit 8 comprises five banks of read only memory (ROM) 81,82,83,84 and 85. The ROM 81 is addressed by the signals on lines 14 and 15 and is programmed as shown in table 1. The outputs of the ROM 81 are fed to the vertical interpolator 5 over the path 20, to the horizontal interpolator 6 over the path 21, and to the store 7 over the path 22. The ROM 82 contains the co-efficients for the vertical filter 3 and is addressed over the path 16 so that it outputs filter co-efficients over the path 18 to the filter 3 which are dependent on the picture size in the vertical direction set by the potentiometer 9. The stored co-efficients may be pre-calculated in a known manner from a knowledge of the cut-off frequency desired for given picture sizes. The smoothness of cut-off frequency change will be dependent on the size of ROM used. Similarly the ROM 83 contains the co-efficients for the horizontal filter 4 and is addressed over the path 17 so that it outputs filter co-efficients over the path 19 to the filter 4 which are dependent on the picture size in the horizontal direction set by the potentiometer 10. The ROM 84 is addressed over the path 16 and outputs a code over the path 20 to the vertical interpolator 5 which is dependent on the vertical picture size set by the potentiometer 9. The interpolator 5 uses this code to determine the required sample positions. Similarly the ROM 85 is addressed over the path 17 and outputs a code over the path 21 to the horizontal interpolator 6 which is dependent on the horizontal size of the picture as set by the potentiometer 10. The path 24 is connected to the ROM's 82 and 83 to cause them to output filter co-efficients to the filters 3 and 4 which produce the lowest cut-off frequencies of those filters. Thus by operating the switch 23 a soft focus effect can be produced. The signal on path 24 overules the signals on paths 16 and 17 and appropriate decoding circuitry is included in or before the ROM's 82 and 83.

Various modifications may be made to the embodiment shown. For example alternative arrangements may be used for selecting the picture sizes including pattern generators which may be microprocessor controlled or comprise micro or mini computers. Alternative methods of re-configuring the arrangement of the interpolators and store may be used, the illustrated embodiment being only a convenient arrangement amongst other possible arrangements.

The arrangement shown is suitable for use in a luminance channel and could be repeated for the colour difference signals. The horizontal and vertical filters may be omitted in the colour difference signal channel if the decrease in performance can be tolerated. Similarly the performance of the interpolators is not so critical in the colour difference channel.

Although the arrangement has been described with reference to an embodiment in which the positions of the horizontal and vertical interpolators and the field store are interchangeable the invention is not restricted to use in such a situation. It would, for example, be equally applicable to an arrangement in which the interpolators and store were fixed in position either because only picture compression was catered for or because separate interpolators were provided at the input and output of the store.

I claim:

1. A video signal processing apparatus for television signals encoded in digital form comprising a horizontal interpolator, a vertical interpolator, a field store, at least one of a horizontal or a vertical low pass filter for filtering the input video signal before application to the horizontal and vertical interpolators and the field store, and means for reducing the cut-off frequency of at least one of a horizontal or vertical filter as the picture size is reduced in the horizontal or vertical direction, further including means for reducing the cut-off frequency of the horizontal or vertical filter to a frequency which is less than the bandwidth of the input video signal independent of the picture size when the production of a soft focus effect is desired.

2. An apparatus as claimed in claim 1, wherein in the means for reducing the cut-off frequency of the filters comprises a read only memory containing a plurality of sets of filter co-efficients stored at different memory locations, and means for addressing the read only memory in dependence on the selected picture size so that the appropriate filter co-efficients are fed to the filters.

3. An apparatus as claimed in claim 2, wherein said means for reducing the cut-off frequency is arranged to address a single read only memory location for each filter.

4. An apparatus as claimed in claim 3, wherein the means for reducing the cut-off frequency comprises a selection switch.

5. An apparatus as claimed in claim 2, wherein the means for reducing the cut-off frequency provides a variable cut-off frequency for the horizontal and vertical filters.

6. An apparatus as claimed in claim 5 wherein the means for reducing the cut-off frequency comprises a variable voltage source, a selection switch and an analogue to digital converter, the output of the analogue to digital converter being coupled to address inputs of the read only memory.

7. An apparatus as claimed in claim 1, wherein the means for reducing the cut-off frequency is capable of providing a variable cut-off frequency for the horizontal and vertical filters.

* * * * *